United States Patent [19]

Hirano

[11] E Patent Number: Re. 32,785

[45] Reissued Date of Patent: Nov. 15, 1988

[54] AUDIO-FREQUENCY ELECTROMECHANICAL VIBRATOR

[75] Inventor: Mutsuo Hirano, Isesaki, Japan

[73] Assignee: Sanden Corporation, Gunma, Japan

[21] Appl. No.: 84,031

[22] Filed: Aug. 10, 1987

Related U.S. Patent Documents

Reissue of:

[64] Patent No.: 4,635,287
Issued: Jan. 6, 1987
Appl. No.: 661,916
Filed: Oct. 17, 1984

[30] Foreign Application Priority Data

Oct. 19, 1983 [JP] Japan ..... 58-161394[U]
Oct. 19, 1983 [JP] Japan ..... 58-161395[U]
Oct. 19, 1983 [JP] Japan ..... 58-161396[U]

[51] Int. Cl.[4] ..... H04R 1/04; H04R 9/00

[52] U.S. Cl. ..... 381/194; 128/33; 381/90; 381/152; 381/158; 381/188; 381/199

[58] Field of Search ..... 381/194, 151, 152, 158, 381/162, 188, 192, 199, 201, 88, 86; 128/33

[56] References Cited

U.S. PATENT DOCUMENTS 2,501,032 3/1950 Harbaugh ..... 179/115.5 PC
3,185,767 5/1965 Olson et al. ..... 179/115.5 VC
4,506,379 3/1985 Komatsu ..... 381/68

FOREIGN PATENT DOCUMENTS 62600 10/1980 European Pat. Off. ..... 179/115.5 R
123359 10/1984 European Pat. Off. ..... 179/115.5 R
3527501 3/1986 Fed. Rep. of Germany ..... 381/194
55-3233 1/1980 Japan ..... 179/107 BC
1063914 4/1967 United Kingdom ..... 179/115.5 VC

OTHER PUBLICATIONS

Jacobs, Ed., "What's New for Your Car," *Popular Science*, Nov. 1979, p. 97.

*Primary Examiner*—Jin F. Ng
*Assistant Examiner*—Danita R. Byrd
*Attorney, Agent, or Firm*—Hopgood, Calimafde, Kalil, Blaustein & Judlowe

[57] ABSTRACT

An audio-frequency electromechanical vibrator having a flat hollow case with a thin cover plate, a flat ring-shaped permanent magnet axially magnetized and a flat annular drive coil unit. The magnet and the coil unit are disposed in the case coaxial with one another and with an axial space therebetween. The magnet is fixedly mounted on the bottom of the case and the coil unit is elastically supported to the case by a spring plate so that the vibrator can generate strong vibrations without noise generation corresponding to a comparatively higher frequency component in an audio signal applied to the coil unit.

11 Claims, 3 Drawing Sheets

AUDIO-FREQUENCY ELECTROMECHANICAL VIBRATOR

Matter enclosed in heavy brackets [ ] appears in the original patent but forms no part of this reissue specification; matter printed in italics indicates the additions made by reissue.

BACKGROUND OF THE INVENTION (1) Field of the Invention

This invention relates to electromechanical vibrators and, in particular, to audio-frequency electromechanical vibrators adapted for a body-felt vibration reproduction in sound reproducing systems.

(2) Description of the Prior Art

A sound reproducing system has been known in the prior art as disclosed in, for example, U.S. Pat. No. 4,064,376, which reproduces from an electric signal not only sound heard by ear but also mechanical vibration of, preferably undertones lower than 150 Hz, to be directly transmitted to a body. Such a system has an electromechanical vibrator for reproducing the mechanical vibration which is fitted to a bed or a chair. An audio signal to be fed to sound reproducing speakers is also applied to the vibrator, preferably after passing through a filter for removing a higher frequency component than 150 Hz. A person on the chair or bed feels vibration while enjoying music from the speaker through ear.

An electro-dynamic transducer is used for the vibrators in such sound reproducing system, a known vibrator has an arrangement similar to an electro-dynamic speaker, as shown in U.S. Pat. Nos. 4,064,376 and 4,354,067. The known vibrator has a magnetic circuit constituted by one or two permanent magnets and a magnetic yoke with a magnetic gap in which a drive coil is loosely fitted or disposed. The electric signal is applied to the drive coil and therefore, the coil and the yoke are moved relatively to cause the vibration.

In the known vibrator, the drive coil is disposed in a small magnetic gap and therefore strong vibrations can not be generated. Furthermore, a thin and good heat-conductivity case cover is required to make good heat radiation from the drive coil. This means that the case cover tends to vibrate in response to a higher frequency component included in the audio signal applied to the vibrator, so that the vibrator makes noise. In order to prevent the noise generation, the filter must be used to remove the higher frequency component from the audio signal applied to the vibrator.

SUMMARY OF THE INVENTION

It is an object of this invention to provide an audio frequency electromechanical vibrator which can make strong vibrations.

It is another object of this invention to provide a vibrator which does not vibrate in response to a higher frequency component included in an audio frequency signal applied to the vibrator.

It is still another object of this invention to provide a vibrator with a reduced heat generation.

It is yet another object of this invention to provide a vibrator which is generally flat and compact.

It is another object of this invention to provide a vibrator wherein heat generated is readily diffused.

It is still another object of this invention to provide a vibrator which is simple in construction and assembling operation.

The present invention is an audio-frequency electromechanical vibrator comprising an open-topped case of a magnetic material with a cover plate closing the open end, an annular coil unit for receiving an audio-frequency power signal and being disposed within the case, a ring-shaped permanent magnet being axially magnetized, the ring-shaped magnet disposed coaxial with the annular coil unit and facing the coil unit with an axial space therebetween, and a spring damper means supported in the case and for elastically supporting one of the magnet and the coil unit, the other one being fixedly mounted to an inner bottom of the case.

According to the present invention, a flat and compact vibrator can be obtained by the use of a flat hollow case, a flat coil unit and a flat magnet. The vibrator can produce strong and neat vibration with a reduced heat generation.

The vibrator according to the present invention can be driven by an audio-frequency signal without the use of a filter for removing a comparatively higher frequency component, because neither coil unit nor magnet is directly connected to a thin cover plate.

In an aspect of the present invention, the case has a central boss portion formed by a central portion of the bottom of the case being inwardly raised. The coil unit and the magnet are disposed within an annular space around the central boss portion and coaxial with the central boss portion. A spring pale is supported on, and coaxial with, the central boss portion.

In another aspect of the present invention, the case has terminal plate means having terminals to which leads of the coil unit are connected. An electrical cable can also be connected to the terminal means after completion of assembling of the vibrator, to supply the audio signal to the coil unit.

In still another aspect of the present invention, the case has a plurality of small holes for permitting air to flow therethrough, and a sponge-like soft and porous member is disposed in the case to close the small holes.

Further objects, features and other aspects of the present invention will be understood from the following detailed description of preferred embodiments referring to the accompanying drawings.

DETAILED DESCRIPTION OF PREFERRED EMBODIMENTS

Prior to description of preferred embodiments of the present invention, a known audio-frequency electromechanical vibrator is described in connection with FIG. 1.

Figure 1:
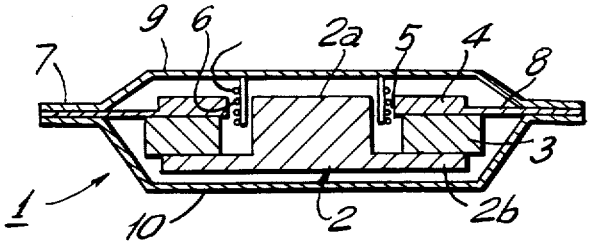
FIG.1 (PRIOR ART)
FIG. 1 is a sectional view of a known audio-frequency electromechanical vibrator.

Referring to FIG. 1, a known audio-frequency electromechanical vibrator 1 shown therein comprises a magnetic circuit constituted by a magnetic yoke 2 of a inversed T-shape having a center pillar 2a and a bottom plate 2b, a ring-shaped permanent magnet 3 disposed on bottom plate 2b, and an annular top yoke plate 4 attached on permanent magnet 3. An annular small space or a magnetic gap 5 is formed between a top portion of center pillar 2a and an inner end of annular plate 4. A drive coil 6 is loosely fitted or disposed in the magnetic gap 5. The magnetic circuit structure is elastically supported by a case 7 through a spring plate 8, and drive coil 6 is supported by a case cover 9 through a coil bobbin 10.

Since drive coil 6 is disposed in a static magnetic field generated in the magnetic gap 5, drive coil 6 and the magnetic circuit structure (2-3-4) are relatively moved when an electric A.C. current is applied to drive coil 6. Thus, the vibrator 1 vibrates in response to an electric audio signal applied to drive coil.

Since drive coil 6 is loosely fitted in the magnetic small gap 5, it is a small coil of a thin wire, so that a large current cannot be applied to drive coil 6. Therefore, the known vibrator 1 has a problem that a strong vibrations cannot be generated, as described hereinabove.

In order to radiate heat generated by drive coil 6, case cover 9 is made of a thin and good heat conductivity material. This means that cover plate 9 vibrates in response to a higher frequency component included in an audio-frequency signal applied to the vibrator to make noise, as described hereinabove. Therefore, a filter must be used before the audio-frequency signal is applied to the vibrator.

The present invention resolves such problems and provides an improved audio-frequency electromechanical vibrator.

Figure 2:
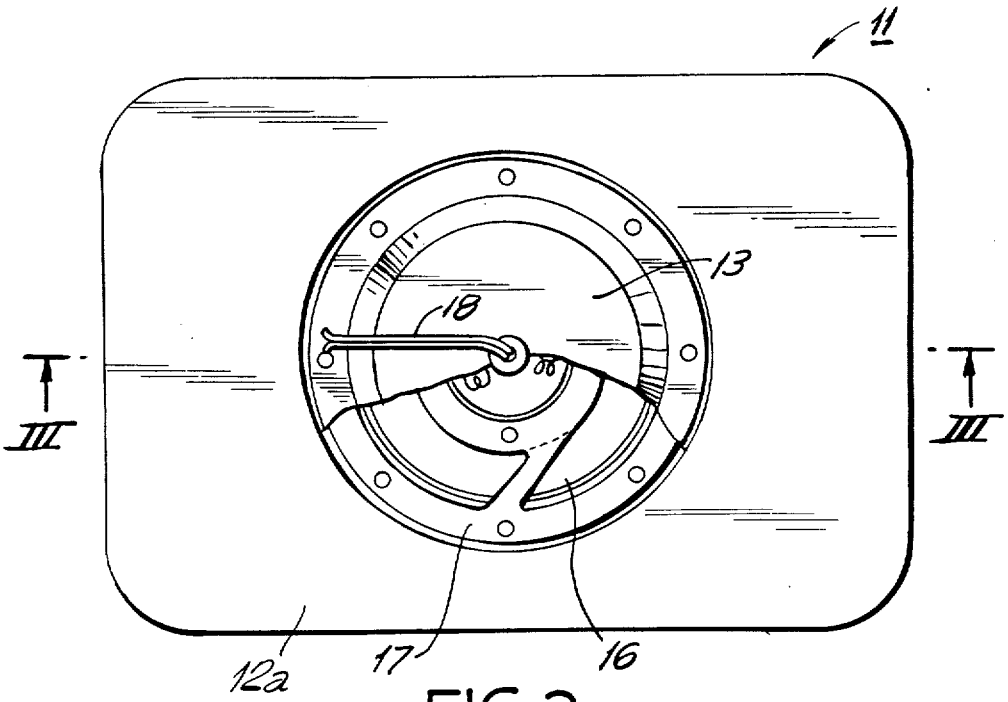
FIG. 2 is a partially exploded plan view of an embodiment according to the present invention.
Figure 3:
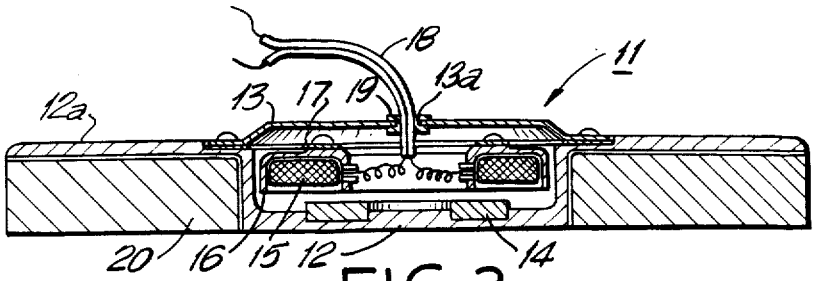
FIG. 3 is a sectional view of the embodiment taken along a line III—III in FIG. 2.

Referring to FIGS. 2 and 3, a vibrator 11 according to a embodiment of the present invention has a open-topped case 12 of a magnetic material and a cover case 13 closing the open top end of the case 12.

A ring-shaped permanent magnet 14 axially magnetized is fixedly mounted onto an inner bottom surface of case 12. An annular coil 15 is disposed to face magnet 14 with a space therebetween. The annular coil 15 is contained in an annular coil housing 16 of a magnetic material. The coil 15 is secured to coil housing 16 by, for example, adhesive agent to form a coil unit. The coil housing 16 is fixed to a spring plate 17 which is fixedly secured to case 12, so that the coil unit is elastically supported by spring plate 17 in case 12.

An electric cable 18 is led into case 12 through a hole 13a formed in case cover 13 and is electrically connected to coil 15. A gum bushing 19 is fitted in hole 13a to hold electric cable 18.

Case 12 has an outer annular flange portion 12a to which a vibration plate 20 is joined.

In the arrangement of vibrator 11, since an axial end of ring-shaped permanent magnet 14 faces to an axial end of annular coil 15, the coil unit (15-16) including coil 15 moves axially in relation to case 12 having magnet 14 at a time when an electric current is applied to coil 15. Thus, application of audio signal to coil 15 axially drives the coil unit (15-16) reciprocatively to make vibration corresponding to the audio signal.

Since coil unit (15-16) faces an axial end of ring-shaped magnet 14 and is disposed in a large space in case 12, a large coil can be used in the vibrator which has a large number of windings and made of a thick wire. Therefore, the vibrator can generate strong vibrations with a reduced heat generation.

It will be understood that the vibrator can be made flat and compact by the use of a flat coil unit and a flat magnet.

Furthermore, since cover plate 13 is not directly connected to coil 15 and magnet 14 which are relatively moved, it is not directly vibrated by coil 15 or magnet 14. Therefore, cover plate 13 does not generate noise even if it is made of a thin and good heat-conductivity plate. This means that a filter is not necessary for removing a higher frequency component from an audio-frequency signal applied to the vibrator.

The vibrator is adapted to, for example, a chair.

Figure 4:
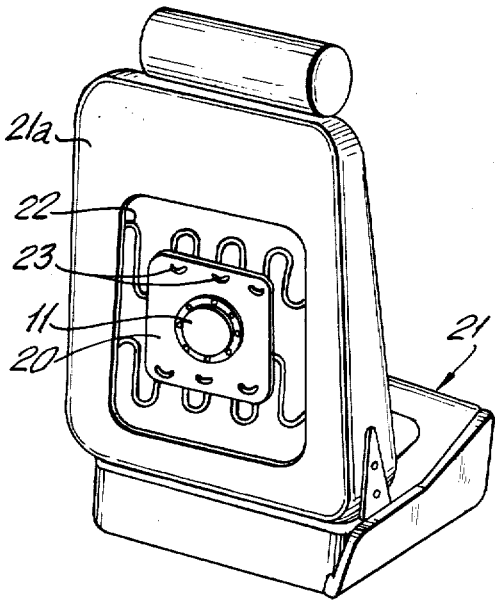
FIG. 4 is a perspective view of a chair using the vibrator, partially exploded for viewing the vibrator attached thereto.

Referring to FIG. 4, vibrator 11 is mounted in a chair back 21a of a chair 21 by securing vibration plate 20 to a cushion spring 22 in the chair back by, for example, strings or tapes 23.

A person on the chair 21 feels vibration at his back when an audio signal is applied to the vibrator 11.

Figure 5:
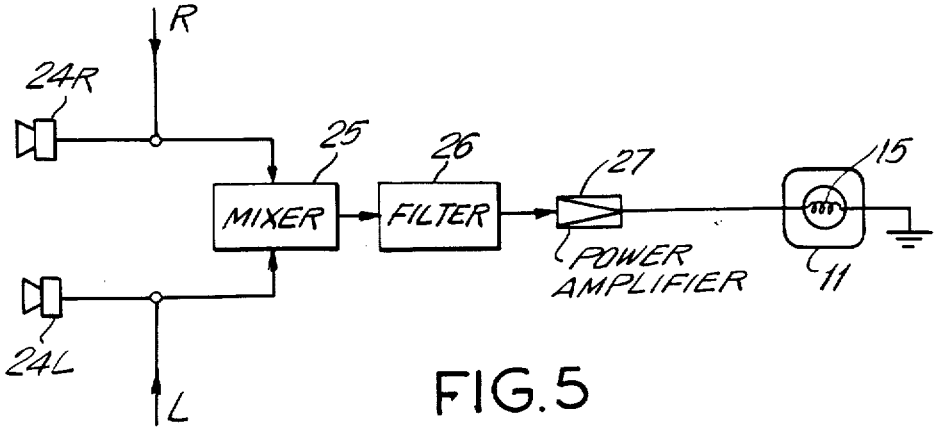
FIG. 5 is a schematic circuit diagram view of a system driving the vibrator.

Referring to FIG. 5, a right channel (R) signal and a left channel signal (L) are applied to respective speakers 24R and 24L from an audio signal amplifier (not shown). The R and L signals are also inputted into a mixer circuit 25. The output signal from mixer 25 is applied to coil 15 of vibrator 11 through a filter 26 and a power amplifier.

Filter 26 is for removing a frequency component lower than 99 Hz from the output of mixer 25 because a lower frequency signal is considered unpleasant.

Figure 6:
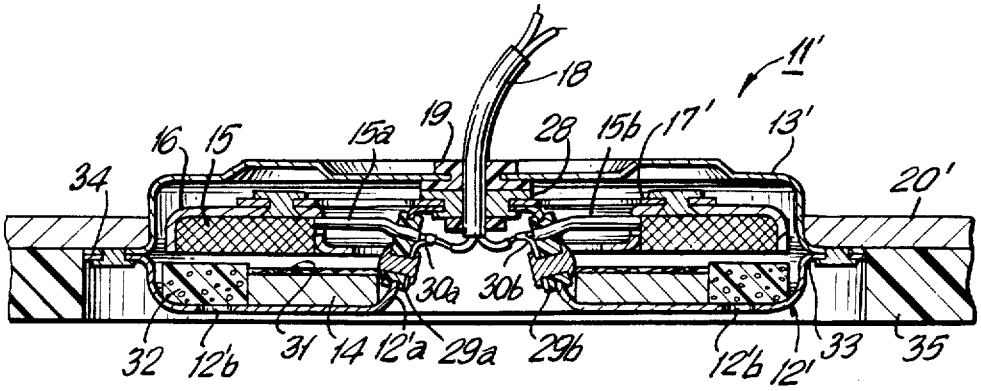
FIG. 6 is a sectional view of another embodiment of the present invention.
Figure 7:
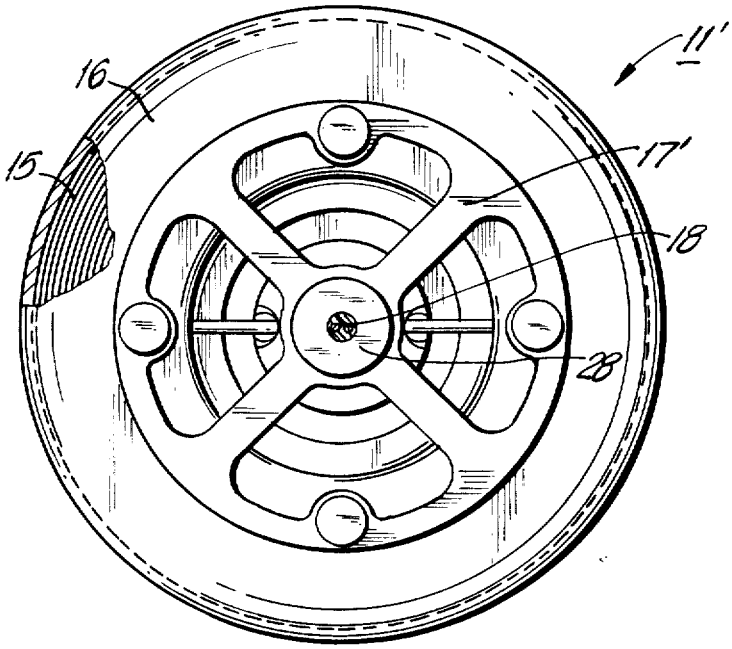
FIG. 7 is a partially exploded plan view of the embodiment of FIG. 6, with a cover plate being removed.

Referring to FIGS. 6 and 7, another embodiment 11' shown therein is similar to the vibrator 11 in FIGS. 2 and 3 but is different therefrom, mainly, in support of the coil unit. The similar parts are represented by the same reference numerals as FIGS. 2 and 3, and a detailed description thereto is omitted for purpose of simplification of the description.

A central portion of a bottom of a case 12' is raised upwardly so that the case 12' is formed to have a cross section of a W-like shape. Thus, the case has a central boss portion 12'a.

Ring-shaped permanent magnet 14 and the coil unit (15-16) are disposed in an annular space around the central boss portion 12'a. Magnet 14 is fixedly mounted on the inner bottom of case 12', and coil unit (15-16) faces magnet 14 with a space therebetween. Coil unit (15-16) is fixed to a spring plate 17'.

Spring plate 17' is fixedly secured to boss portion 12'a by joining a central portion of spring plate 17' to the top end of the boss portion 12'a by, for example, a rivet 28, so the boss portion 12'a, spring plate 17' and coil unit (15-16) are disposed coaxially. Thereby, coil unit 15-16 can vibrate uniformly.

Terminal plates 29a and 29b are mounted in an annular wall of boss portion 12'a, and lead wires 15a and 15b are connected to terminals 30a and 30b of terminal plates 29a and 29b. Electric cable 18 is led out to the back side of the case 12' through gum bushing 19 and a central hole of rivet 28, and is connected to terminals 30a and 30b, as shown in FIG. 6. Thus, electric cable 18 can be fixed to case 12' and electrically connected to coil 15 without removal of case cover 13 after the vibrator is completely assembled.

A ring shaped felt pad 31 is overlaid onto magnet 14 to form a buffer between the magnet and the coil unit (15-16).

Furthermore, a ring member 32 of a soft and porous, such as sponge-like material is disposed around magnet 14 to serve as another buffer between magnet 14 and the coil unit (15–16).

Case 12' is provided with a number of small holes 12'b along the ring member 32 so that holes 12'b are closed by the ring member. Air in the case 12' is exchanged through the holes 12'b and the sponge-like ring member serves as a filter for removing dust.

Outer circumference flange portion 33 and 34 of case 12' and case cover 13' are joined and are together secured to a vibration plate 20' by screw means. Vibration plate 20' is of a hard material, and may be backed with another plate 35 of a soft material.

In the above described embodiments, the permanent magnet is fixedly mounted to the case and the coil unit is elastically supported by the spring plate. However, it will be easily understood that the magnet and the coil unit may be mounted to the spring plate and the case, respectively.

What is claimed is:

1. An audio frequency electromechanical vibrator comprising:

an open-topped flat case of a magnetic material with a cover plate closing the open end;

a annular drive coil unit for receiving an audiofrequency power signal and being disposed within said case, said coil unit comprising a annular coil housing of magnetic material with an open axial end and a coil contained in, and fixed to, said coil housing;

a flat ring-shaped permanent magnet having an axial end and being axially magnetized, said ring-shaped permanent magnet being disposed coaxial with, and adjacent, said annular coil unit in an axial direction so that said axial end of said permanent magnet faces said open axial end of said coil housing with an axial gap left therebetween; and a spring damper plate being supported in said case for elastically supporting one of said coil unit and said magnet, the other one of said coil unit and said magnet being fixedly mounted to an inner bottom of said case.

2. The vibrator as claimed in claim 1 wherein said cover plate is made of a thin and good heat-conductivity plate.

3. The vibrator as claimed in claim 1, which further comprises a ring-shaped buffer means overlaid onto said axial end of said magnet.

4. The vibrator as claimed in claim 1, wherein said case is provided with a plurality of small holes, a sponge-like soft and porous member being disposed in said case to close said holes.

5. The vibrator as claimed in claim 1, wherein said case has a central boss portion which is inwardly raised continuous with a bottom portion of said case, said spring plate being supported onto a top end of said central boss portion.

6. The vibrator as claimed in claim 5, wherein said magnet and said coil unit are disposed in an annular space around said central boss portion and coaxial with said boss portion and said spring plate.

7. The vibrator as claimed in claim 5, which further comprises terminal plate means mounted in a wall portion of said boss portion, electric terminal means mounted on said terminal plate means, electric lead wires of said coil being connected to said electric terminal means, and an electric cable for supplying said audio-frequency power signal to said coil and being connected to said terminal means.

8. The vibrator as claimed in claim 7, wherein said cover plate has a central hole, said central boss portion having a central hole, said electric cable being led to a back side of said case through said central portion.

9. The vibrator as claimed in claim 4, wherein said magnet is fixedly mounted onto a bottom plate of said case, said small holes being located around said magnet, said sponge-like member being formed annular and being disposed around said magnet.

10. The vibrator as claimed in claim 1, which further comprises an outer annular flange formed on said case, wherein a vibration plate is fixed to said flange.

11. The vibration as claimed in claim 10, which further comprises a soft material plate mounted as a backing to said vibration plate.

* * * * *